United States Patent [19]

Dopfer et al.

[11] 4,429,586
[45] Feb. 7, 1984

[54] DOUBLE-OBLIQUE-TOOTHED TWO-STAGE SPUR WHEEL DRIVE

[75] Inventors: Maximilian Dopfer, Sonthofen; Günther Heidrich, Burgberg-Ortwang, both of Fed. Rep. of Germany

[73] Assignee: BHS-Bayerische Berg, Hütten-und Salzwerke Aktiengesellschaft, Munich, Fed. Rep. of Germany

[21] Appl. No.: 191,159

[22] Filed: Sep. 26, 1980

[30] Foreign Application Priority Data

Oct. 4, 1979 [DE] Fed. Rep. of Germany ....... 2940323

[51] Int. Cl.³ ............... F16H 57/00; F16H 1/12; F16H 1/20; F16H 37/06
[52] U.S. Cl. .................. 74/410; 74/421 R; 74/665 N; 74/665 L
[58] Field of Search ............. 74/665 N, 665 P, 665 L, 74/424.5, 466, 421 A, 421 R, 410, 409

[56] References Cited

U.S. PATENT DOCUMENTS

| | | | |
|---|---|---|---|
| 1,220,811 | 3/1917 | Alquist | 74/421 R |
| 1,359,853 | 11/1920 | Wilkinson | 74/410 |
| 1,458,131 | 6/1923 | Davis | 74/410 |
| 1,459,964 | 6/1923 | Alquist | 74/410 |
| 1,499,617 | 7/1924 | Kasley | 74/410 |
| 1,740,756 | 12/1929 | Weis | 74/410 |
| 1,759,689 | 5/1930 | Day | 74/410 |
| 1,817,216 | 8/1931 | Uggla | 74/421 A |
| 2,734,396 | 2/1956 | Falk et al. | 74/410 |
| 3,029,661 | 4/1962 | Schmitter | 74/421 A |
| 3,396,594 | 8/1968 | Walker | 74/409 |
| 3,881,444 | 5/1975 | Sigg | 74/665 L |
| 4,222,288 | 9/1980 | Mange | 74/421 R |

FOREIGN PATENT DOCUMENTS 883639 12/1961 United Kingdom ............. 74/665 P

Primary Examiner—Lawrence J. Staab
Assistant Examiner—Michael D. Bednarek
Attorney, Agent, or Firm—Silverman, Cass & Singer, Ltd.

[57] ABSTRACT

In a double-oblique-toothed stage spur wheel drive, the first stage includes a first pinion which drives a first toothed wheel by way of an intermediate wheel. The first stage drives the second stage which includes a second pinion coupled with the first toothed wheel and a second toothed wheel meshing with said second pinion. The first pinion and the first toothed wheel each include a respective coaxial pair of gear wheel halves having oppositely-directed oblique teeth, and the intermediate wheel includes two pairs of intermediate gearwheel halves, with all of the gear wheel halves being coaxially disposed. One of said intermediate gear wheel half pairs engages with the first pinion and the other engages with the first toothed wheel.

5 Claims, 6 Drawing Figures

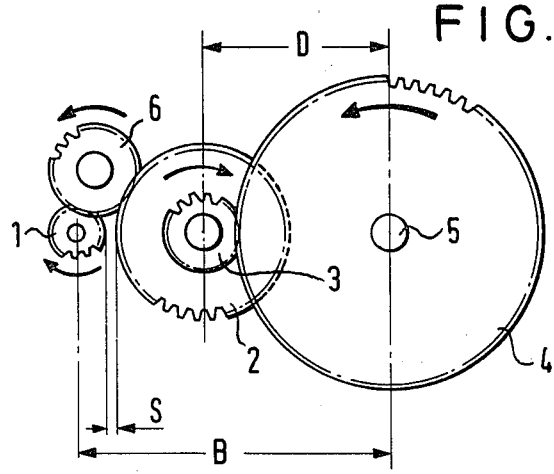
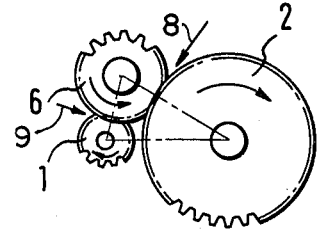
FIG. 1 PRIOR ART
FIG. 2 PRIOR ART
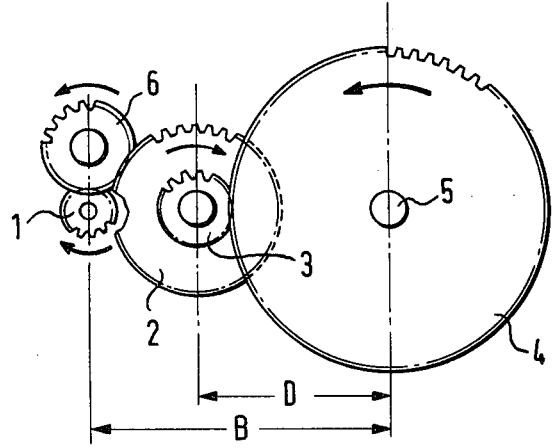
FIG. 3
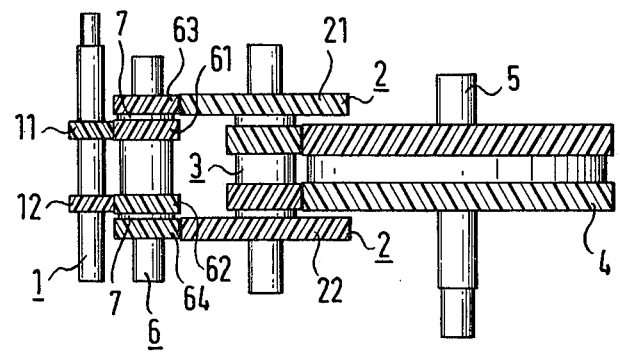
FIG. 4

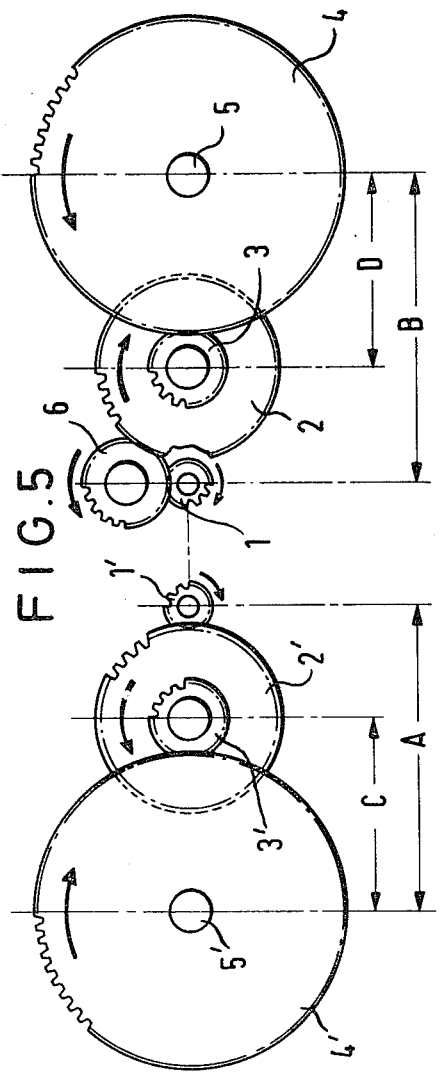
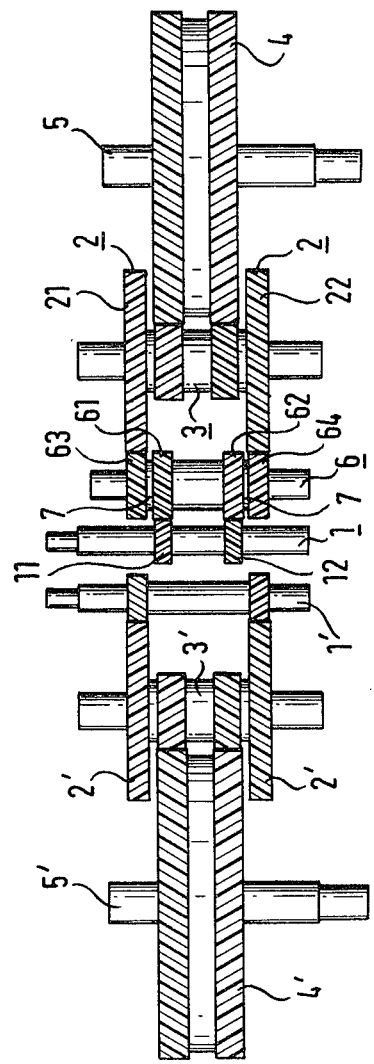

DOUBLE-OBLIQUE-TOOTHED TWO-STAGE SPUR WHEEL DRIVE

BACKGROUND OF THE INVENTION

This invention concerns a double-oblique-toothed two-stage spur wheel drive. This drive comprises a first pinion consisting of gearwheel halves that are coupled by way of an intermediate wheel composed also of respective gearwheel halves, with respective gearwheel halves of a first toothed wheel in a first stage of the drive. The first toothed wheel is coupled with a second pinion which meshes with a second toothed wheel in a second stage of the drive.

In one known such drive, which will be described in further detail with reference to certain figures of the drawings, the arrangement of the first pinion, the intermediate wheel and the first toothed wheel in the first gear is essentially such that the spacing between the axes of the first pinion and the first toothed wheel is greater than the sum of the radii of the said first pinion and first toothed wheel. This is necessary to avoid the possibility of the first pinion and the first toothed wheel meshing with or obstructing one another, and necessarily results in an enlargement of the spacing between the axes.

A further disadvantage of this known proposal is that the forces acting on the teeth of the intermediate wheel, resulting from the meshing with the first pinion and the first gear wheel, are essentially in opposite directions, so that the teeth of the intermediate wheel are required to yield in opposite directions. This factor dictates that the toothing must necessarily be broad, with corresponding increase in the width of the drive.

The above-discussed disadvantages arise particularly when the known type of double-oblique-toothed two-stage spur wheel drive is used to drive a ship, since in such an environment lengths and widths of the drive are of particular significance.

OBJECT OF THE INVENTION

An object of the invention under consideration is to provide, in contrast to the known type of drive, a double-oblique-toothed two-stage spur drive wheel in which a reduction of the size of the structure and of the gearing is possible.

SUMMARY OF THE INVENTION

This problem is solved in accordance with the invention in that the intermediate wheel comprises two further gearwheel halves which mesh with the two gearwheel halves of the first toothed wheel and in that meshing of the intermediate wheel with the first toothed wheel occurs only through these gearwheel halves and meshing of the first pinion and the intermediate wheel occurs only through the other gearwheel halves. This results in the advantage that a reduction in size of the structure of the spur wheel drive can be achieved, and at the same time substantial loads can be transmitted without broadening the gearing.

In a development of the invention, the gearwheel halves of the intermediate wheel which mesh with the first pinion are fitted inside and the half gears of the intermediate wheel which mesh with the first toothed wheel are fitted outside. Furthermore the diameters of the pitch circles of the inner and outer gearwheel halves of the intermediate wheel can be of equal size.

Advantageously the inner and outer gearwheel halves possess the same gearing geometry so that simplicity of production is achieved.

In a further development of the invention, in each case the inner and outer gearwheel half of one side of the intermediate wheel are separated from each other by a narrow gap at least as far as below the base circle, that is to say a circle through the roots of the teeth of the gearwheel. This avoids the teeth being subjected to contrary acting forces.

In accordance with another characteristic of the invention, the pinion with the inner toothing can be exchangeable with a pinion with outer toothing, which after enlargement of the intermediate wheel, meshes directly with the first toothed wheel. This makes it possible, in a simple way, to achieve reversal of the direction of rotation of the drive, whereby the field of application of the spur wheel drive of the invention is extended.

The drive of the invention can be used as one drive of an installation of a ship having two driving units with respective motors driving in the same direction of rotation, giving contrary directions of rotation to respective propeller shafts.

BRIEF DESCRIPTION OF THE DRAWINGS

The invention will be described further, by way of example, with reference to the accompanying drawings, in which:

FIG. 1 is a diagrammatic side elevation view illustrating the arrangement of a known construction of a double-oblique-toothed two-stage spur wheel drive;

FIG. 2 is a detached side elevation view of part of FIG. 1 illustrating the tooth pressures arising therein;

FIG. 3 is a diagrammatic side elevation view illustrating a first embodiment of the double-oblique-toothed two-stage spur wheel drive conforming to the present invention;

FIG. 4 is a plan view of the drive illustrated in FIG. 3;

FIG. 5 is a side elevation view illustrating a ship's drive assembly which includes two drives of which one corresponds to that shown in FIGS. 3 and 4; and FIG. 6 is a plan view of the drive illustrated in FIG. 5.

BRIEF DESCRIPTION OF THE PRIOR ART DRIVE OF FIGS. 1 AND 2

In FIG. 1, there is shown a double-oblique-toothed two stage spur wheel drive which is part of the state of the art. The first stage is provided by a first pinion 1 that, through an intermediate wheel 6, is coupled to a first toothed wheel 2. The second stage is provided by a pinion 3 and a second toothed wheel 4 which is located on a shaft 5.

With this arrangement it is necessary to set the pinion 1 at a spacing S away from the wheel 2 so that it does not mesh therewith. This necessarily increases the spacing B between the axes of the pinion 1 and the shaft 5.

A further disadvantage of this known type of arrangement is illustrated in FIG. 2. Arrows 9 and 8 show that the tooth-pressures acting on the gearing of the intermediate wheel 6, respectively, from the meshing with the pinion 1 and the toothed wheel 2, have contrary directions, so that the teeth of the intermediate wheel 6 are required to deflect in opposite directions. This extra load necessitates broader toothing and thus leads to a greater length of the drive.

DESCRIPTION OF THE PREFERRED EMBODIMENTS

Referring now to FIGS. 3 and 4, the embodiment of the double-oblique-toothed two-stage spur wheel drive conforming to the invention and shown therein, has a first pinion 1 which, through an intermediate wheel 6, is coupled with a first toothed wheel 2. This arrangement forms the first stage of the spur wheel drive.

The first toothed wheel 2 is connected to a second pinion 3 which meshes with a second toothed wheel 4 and forms the second stage. The second toothed wheel 4 is located on a shaft 5. As a result of the construction in accordance with the invention, the spacing B between the axis of the first pinion 1 and the axis of the second toothed wheel 4 is smaller than the spacing B of the known construction shown in FIG. 1. The spacing D between the axis of the second toothed wheel 4 and the axis of the second pinion 3, however, remains the same.

FIG. 4 shows the drive of the invention of FIG. 3 in plan view. It will be seen that the pinion 1 comprises two gearwheel halves 11 and 12, having oppositely-directed oblique teeth and meshing with two inner gearwheel halves 61 and 62 of intermediate wheel 6.

The intermediate wheel further includes outer gearwheel halves 63 and 64 which mesh with the gearwheel halves 21 and 22 of the first toothed wheel 2. The first transmission stage is thus divided and the gearwheel halves thereof are situated one on each side of their shafts. The second pinion 3 as well as the toothed wheel 4 are designed in the same way each to comprise respectively two gearwheel halves having oppositely directed oblique teeth.

The diameters of the pitch circles of the outer gearwheel halves 63 and 64 and of the inner gearwheel halves 61 and 62 of the intermediate wheel 6 are of the same size. Additionally these gears also possess the same gearing geometry and as a result can be produced simultaneously or by similar operations.

Between the outer gearwheel half 63 and the adjacent inner gearwheel half 61 on the one side, and between the inner gearwheel half 62 and the outer gearwheel half 64 on the other side, respective narrow gaps 7 are present. These gaps each extend at least to below the base circle, i.e. the circle through the roots of the teeth of the gearwheels. This avoids the teeth of the gearwheel halves being subjected to contrary-acting tooth-pressures.

In the arrangement of FIGS. 3 and 4, thus the intermediate wheel 6 comprises a pair of outer gearwheel halves 63 and 64, which mesh with the two gearwheel halves 21 and 22 of the first gearwheel wheel 2, and a pair of inner gearwheel halves 61 and 62, which mesh with the gearwheel halves 11 and 12 of the first pinion 1. For ease of understanding, the first pinion 1 in FIG. 4 is shown in a displaced position relative to FIG. 3.

The drive of the invention is advantageously applicable in the driving of ships. FIGS. 5 and 6 show the use of the drive of FIGS. 3 and 4 in a ship's drive installation having two independent drives. The left hand drive in the figures is of usual construction, having a first pinion 1', a first toothed wheel 2' and a second pinion 3'. Pinion 3' meshes with a second toothed wheel 4' that is located on propeller shaft 5'. With this drive, when the pinion 1' is driven in the direction shown by the arrow, the propeller shaft is driven in the same sense of rotation.

With the right hand drive of the installation of FIGS. 5 and 6, which drive conforms to the present invention, the toothed wheel 6 comprises two further gearwheel halves 61 and 62 (FIG. 6) which mesh with the equally inwardly-shifted gearwheel halves 11 and 12 of the first pinion 1. This achieves the same spacings A and B as in FIG. 5. Furthermore an alternating bending or stressing of the teeth of the intermediate wheel 6 is avoided.

Also, the axis spacings C and D (FIG. 5) are equal and the diameters of the comparable toothed wheels of the two drivers have equal dimensions. With regard to the arrangement of the motors in the ship, the whole installation advantageously is arranged in mirror symmetry.

The gearwheels of the intermediate wheel 6 have the same pitch circle diameter and the same gearing geometry. Because of this, considerable simplification can be achieved by common production.

If it should be necessary to fit the drive motors and therewith the first pinions 1 at a higher or lower level in relation to the propeller shaft 5, the invention enables the axle clearances A, B and C, D as well as the vertical displacement to be carried out to the same measurements in both drives.

A further advantage results from the arrangement of the invention, in that it is possible with this type of spur wheel drive, by a simple exchange of the first pinion 1 with the inner gearing 11 and 12, for a pinion 1 with outer gearing and an enlargement of the intermediate wheel 6 with the same transmission relationships to achieve reversal of the direction of rotation with regard to the shaft 5. Thus the field of application of this known drive is considerably extended.

We claim:

1. A double oblique toothed two stage spur wheel drive comprising:
    a first stage including:
    a first dual pinion assembly (1) composed of a coaxial pair of pinion gears (11, 12) having oppositely directed oblique teeth,
    a first coaxial intermediate gear pair (61, 62) driven by said first dual pinion (1) and a second intermediate gear pair (63, 64) coaxial with the first intermediate gear pair (61, 62) and driven thereby, said first and second intermediate gear pairs being of the same diameter and gearing geometry,
    a first coaxial gearwheel pair (2) driven by said second intermediate gear pair (63, 64) and
    a second stage including:
    a second dual pinion assembly (3) composed of a coaxial pair of pinion gears coaxial with said first gearwheel pair (2) and driven thereby, and at least one second gearwheel (4) meshing with and driven by said second pinion (3).

2. The spur-wheel drive of claim 1 in which the first coaxial intermediate gear pair (61, 62) are disposed between the second intermediate gear pair (63, 64).

3. The spur-wheel drive of claim 2 wherein each said coaxial gear of said first coaxial intermediate gear pair (61, 62) is separated from the adjacent coaxial gear of said second pair (63, 64) by a narrow gap at least in the region of its teeth and extending inward to the roots of said teeth.

4. A ship's drive assembly comprising a first motor operating in a predetermined direction of rotation and driving a first propellor shaft by way of a spur-wheel drive as defined in claim 1, and a second motor also operating in said predetermined direction of rotation, and driving a second propeller shaft by way of a respective spur-wheel drive, whereby the two propellor shafts rotate in opposite directions.

5. A double oblique toothed two stage spur wheel drive comprising:
   a first stage including:
   a first dual pinion assembly (1) composed of a coaxial pair of pinion gears (11, 12) having oppositely directed oblique teeth,
   a first coaxial intermediate gear pair (61, 62) driven by said first dual pinion (1) and a second intermediate gear pair (63, 64) coaxial with the first intermediate gear pair (61, 62) and driven thereby, said first and second intermediate gear pairs being of the same diameter and gearing geometry, each said coaxial gear of said first intermediate gear pair being separated from the adjacent coaxial gear of said second intermediate gear pair by a narrow gap (7) at least in the region of its teeth and extending inwardly at least to the roots of
   a first coaxial gearwheel pair (2) driven by said second intermediate gear pair (63, 64) and
   a second stage including:
   a second dual pinion assembly (3) composed of a coaxial pair of pinion gears coaxial with said first gearwheel pair (2) and driven thereby, and at least one second gearwheel (4) meshing with and driven by said second pinion (3).

* * * * *